United States Patent [19]
Hotelling

[11] Patent Number: 5,138,154
[45] Date of Patent: Aug. 11, 1992

[54] SHAFT ANGLE ENCODER WITH ROTATING OFF-AXIS INTERFERENCE PATTERN

[75] Inventor: Steven P. Hotelling, Lahonda, Calif.

[73] Assignee: Gyration Inc., Saratoga, Calif.

[21] Appl. No.: 504,348

[22] Filed: Apr. 4, 1990

[51] Int. Cl.$^5$ ............................................. G01D 5/34
[52] U.S. Cl. ................................. 250/231.12; 356/374
[58] Field of Search ............ 250/203.6, 237 G, 231.14, 250/231.16, 227.11, 231.12; 341/7, 13, 14; 356/345, 363, 373, 375, 374

[56] References Cited

U.S. PATENT DOCUMENTS

| | | | |
|---|---|---|---|
| 3,731,544 | 5/1973 | Acker et al. | 250/203.6 |
| 3,778,163 | 12/1973 | Forward | 250/231.12 |
| 3,892,305 | 7/1975 | Higgins | 250/227.11 |
| 3,947,843 | 3/1976 | Presentey | 341/13 |
| 4,113,381 | 9/1978 | Epstein | 250/231.14 |
| 4,335,306 | 6/1982 | Gort et al. | 250/231.14 |
| 4,339,198 | 7/1982 | Lechter, Jr. | 250/237 G |
| 4,339,959 | 7/1982 | Klaus, Jr. et al. | 250/231.12 |
| 4,361,760 | 11/1982 | Rodgers | 250/231.12 |
| 4,488,041 | 12/1984 | Baudot | 250/231.12 |
| 4,914,291 | 4/1990 | Kan et al. | 250/231.12 |
| 4,920,259 | 4/1990 | Epstein | 250/231.12 |
| 4,930,365 | 6/1990 | Porat et al. | 250/231.12 |

Primary Examiner—David C. Nelms
Assistant Examiner—S. Allen
Attorney, Agent, or Firm—Michael L. Sherrard

[57] ABSTRACT

A shaft angle encoder adapted for use in a hand-held gyroscope has a motor at the core of the gyroscope suspended by two pairs of orthogonal gimbals to provide two-degrees-of-freedom for the inner gimbal. Power is provided to the motor through conductive elements in the bearings without limting the range of motion of the gyroscope. An electro-optical shaft angle encoder for detecting the rotation of the inner gimbal with respect to the outer gimbal includes an optical pattern mounted along a cylindrical portion of the inner gimbal about the axis of rotation of the inner gimbal and in alignment with one of the outer gimbal bearings. A light source and a rotational phase plate are mounted to the outer gimbal and aligned with this optical pattern and a light path is provided through the optical pattern, the rotational phase plate, and the outer gimbal bearing. The rotational phase plate interferences with the image of the optical pattern so as to create an image which rotates about the axis of the outer gimbal bearing as a function of the rotation of the inner gimbal with respect to the outer gimbal. This image is detected by a quadrature sensor mounted on the outer housing which detects the rotation of the image, thus providing a measure of the inner gimbal rotation.

18 Claims, 13 Drawing Sheets

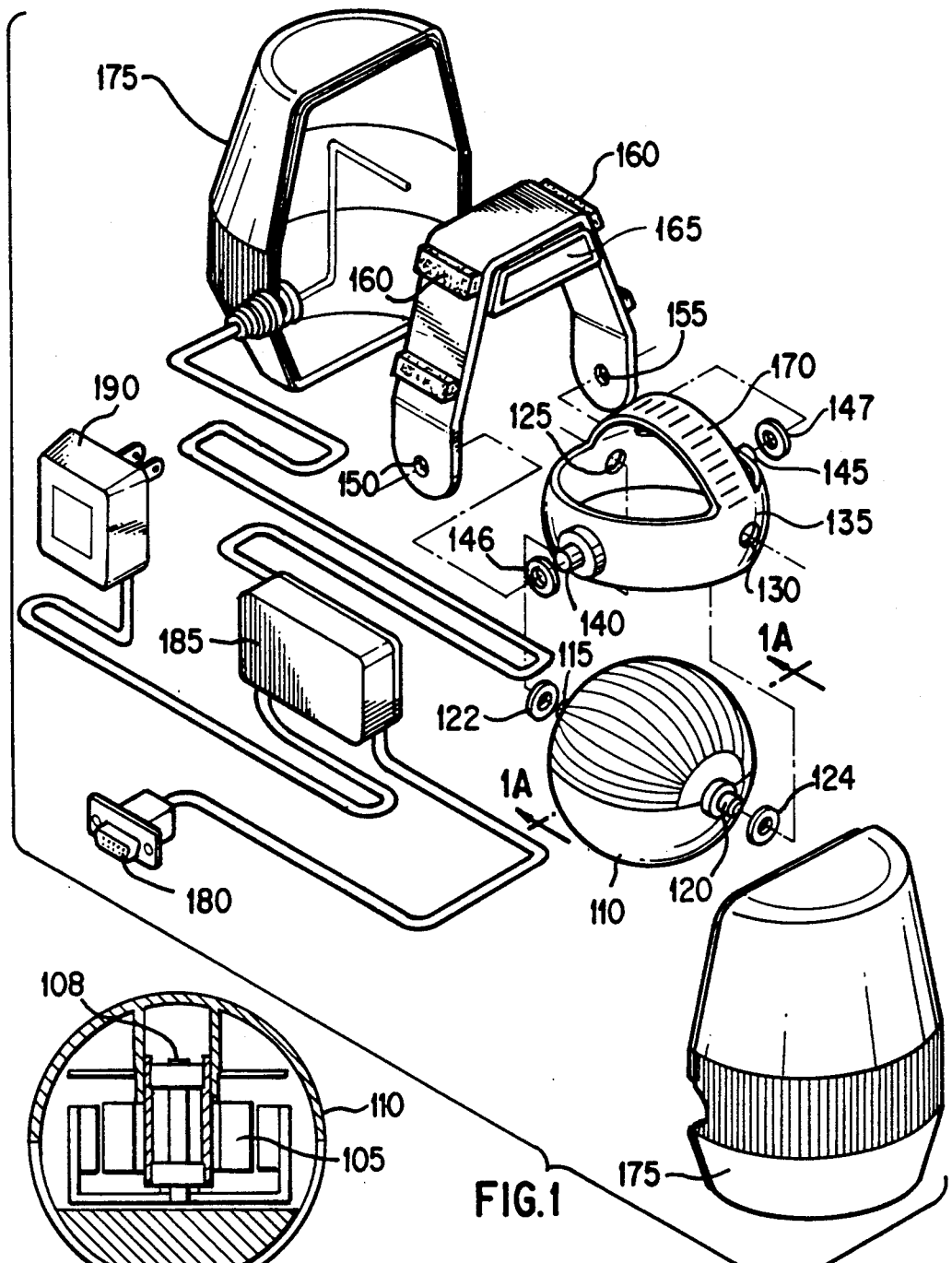
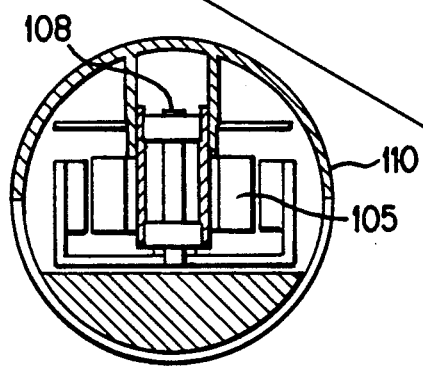
FIG.1
FIG.1A
(SECTION A-A)

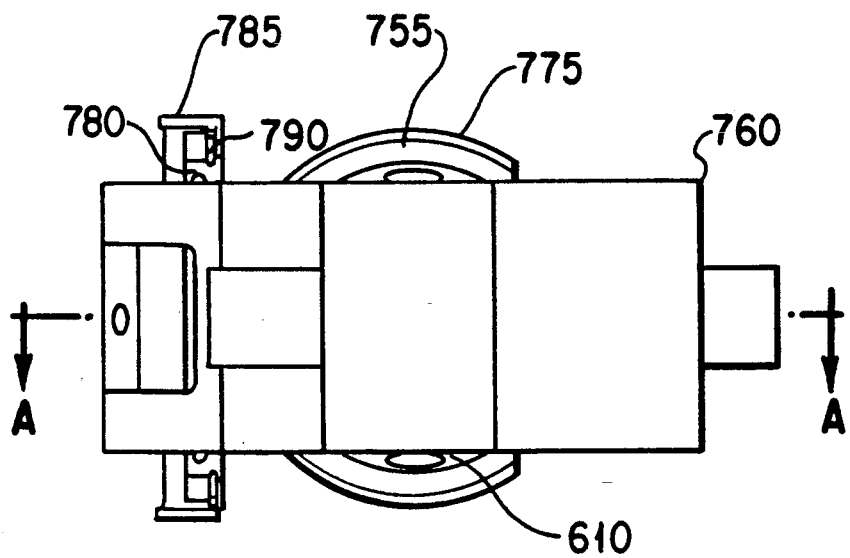
FIG. 7A
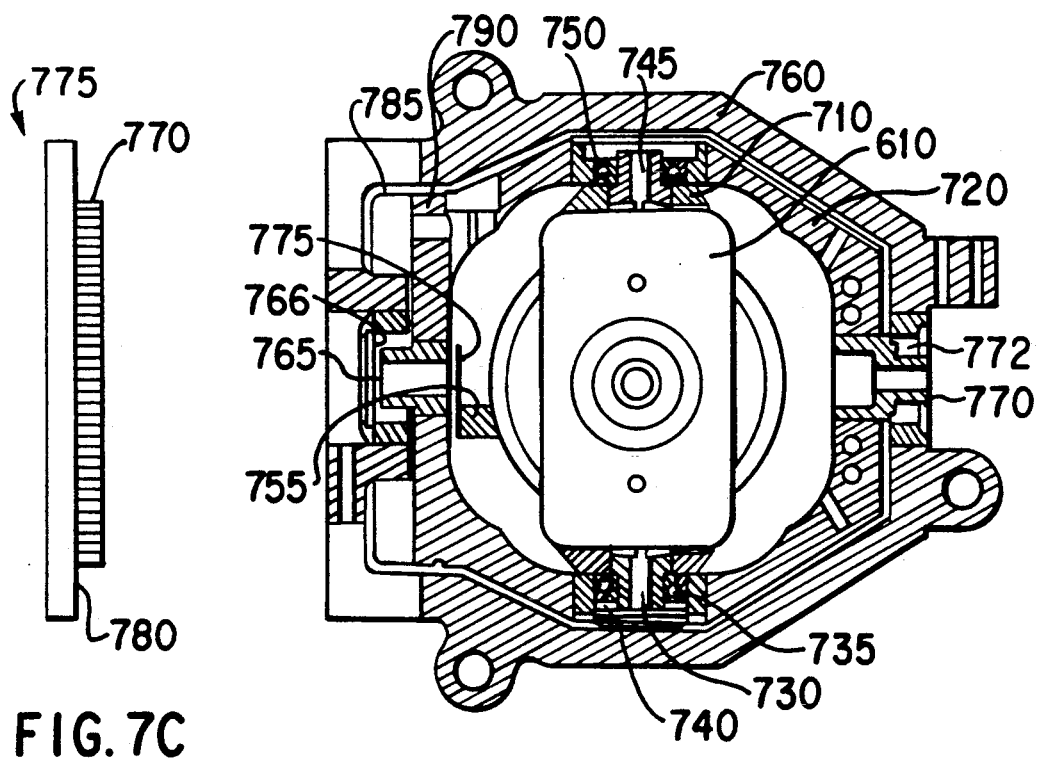
FIG. 7C
FIG. 7B

SHAFT ANGLE ENCODER WITH ROTATING OFF-AXIS INTERFERENCE PATTERN

BACKGROUND OF THE INVENTION

1. Field

The present invention relates to the field of shaft angle encoders. More specifically, the present invention relates to a high resolution rotational shaft angle encoder particularly well adapted to detect the rotation of the inner gimbal of gyroscope.

2. Art Background

Gyroscopes:

Attitude indicators in aircraft, known as artificial horizons, use two-degree-of-freedom gyroscopes for inertia space reference and the measurement of pitch and roll relative to the gravitational vector. The gravity vector is approximated by a pendulous device (suspended weight) which indicates the apparent vertical, that is, the combined effect of gravity and acceleration. Such a device, as described in *Gyroscopic Theory, Design, and Instrumentation*, 1980, Wrigley, Hollister and Denhard, The M.I.T. Press, Cambridge, Mass., uses the average direction of the apparent vertical over a period of time to approximate the direction of gravity. The inner element, or gimbal, rotates on two axes with respect to the frame. Since the only contacts between the housing and the outer gimbal and the outer gimbal and inner gimbal are through the bearings, it is difficult to provide both power to the inner gimbal for the motor and to extract angle information from shaft angle encoders without limiting the range of motion of the gyroscope. Accordingly it is desirable to provide an accurate and inexpensive shaft angle encoder for measuring the angle of rotation of the inner gimbal about its axis of rotation without interfering with the operation of the gyroscope.

Shaft Angle Encoders:

High resolution shaft angle encoders as used in theodolites typically use electro-optical phase quadrature detectors such as described in U.S. Pat. No. 4,346,989, titled Surveying Instrument, issued to Alfred F. Gort and Charles E. Moore Aug. 31, 1982 and assigned to the Hewlett-Packard Company. While these systems have quite high resolution, they are not adapted for use in measuring the angle of rotation of the inner gimbal about its axis of rotation without interfering with the operation of the gyroscope. Further, conventional phase quadrature sensing systems, referred to herein as dual-path systems, employ two separate optical paths which are spaced apart and interact with different areas of an optical pattern. As a result, small variations in the pattern from one area to another, such as line width variations resulting from uneven thermal expansion, introduce undesirable errors. Further still, dual-path system employ two separate detectors, each of which has an associated phase plate. Any misalignment of these two phase plates relative to each other introduces an error into the shaft angle encoder and further reduces its resolution. Accordingly, it is desirable to provide an electro-optical phase quadrature detector adapted for use in measuring the angle of rotation of the inner gimbal of a gyroscope. Further, it is desirable to provide a shaft angle encoder that is not subject to the errors introduced by the use of dual optical paths.

SUMMARY OF THE INVENTION

The present invention is adapted for use in a hand-held gyroscope used as a cursor control device for a computer. A motor at the core of the gyroscope is suspended by two pairs of orthogonal gimbals from a hand-held controller device which provides two-degrees-of-freedom for the inner gimbal. Power is provided to the motor through conductive elements in the bearings without limiting the range of motion of the gyroscope. The spin axis of the motor is nominally oriented vertically by a pendulous device. Electro-optical shaft angle encoders sense the rotation of a hand-held controller device about the gyroscope as it is manipulated by a user. An electro-optical shaft angle encoder for detecting the rotation of the inner gimbal with respect to the outer gimbal includes an optical pattern strip mounted along a cylindrical portion of the inner gimbal about the axis of rotation of the inner gimbal. A light source and a rotational phase plate are mounted on the outer gimbal and aligned with this optical pattern strip and a light path through the axis of an outer gimbal bearing. The rotational phase plate interferes with the image of the optical pattern strip so as to create an image which rotates as a function of the rotation of the inner gimbal with respect to the outer gimbal. This image is directed along the axis of the outer gimbal bearing and focused on a rotational phase quadrature sensor mounted on the housing which detects the rotation of the image, providing a measure of the inner gimbal rotation.

Since the rotational information for the inner gimbal is transmitted optically through the axis of the outer gimbal bearing the inner shaft angle encoder includes no wires or other contacts to limit the movement of the inner gimbal or to introduce any undesirable torques. Further still, since the phase quadrature image utilizes only one area of the optical pattern, there is no error introduced by dual optical paths. Finally, since the system only requires a single phase plate, no error is introduced by phase plate translational misalignment. These and other advantages and features of the invention will become readily apparent to those skilled in the art after reading the following detailed description of the invention and studying the accompanying drawings.

BRIEF DESCRIPTION OF THE DRAWINGS

FIGS. 1 and 1a show an expanded perspective view of one embodiment of the preferred invention.

FIG. 7a is a top view of the gimbal assembly including the inner module of FIGS. 6a and 6b.

FIG. 7b is a cross section view of the gimbal assembly of FIG. 7a along section A—A.

FIG. 7c is an illustration of optical strip 775.

DETAILED DESCRIPTION OF THE PREFERRED EMBODIMENT

Figure 2:
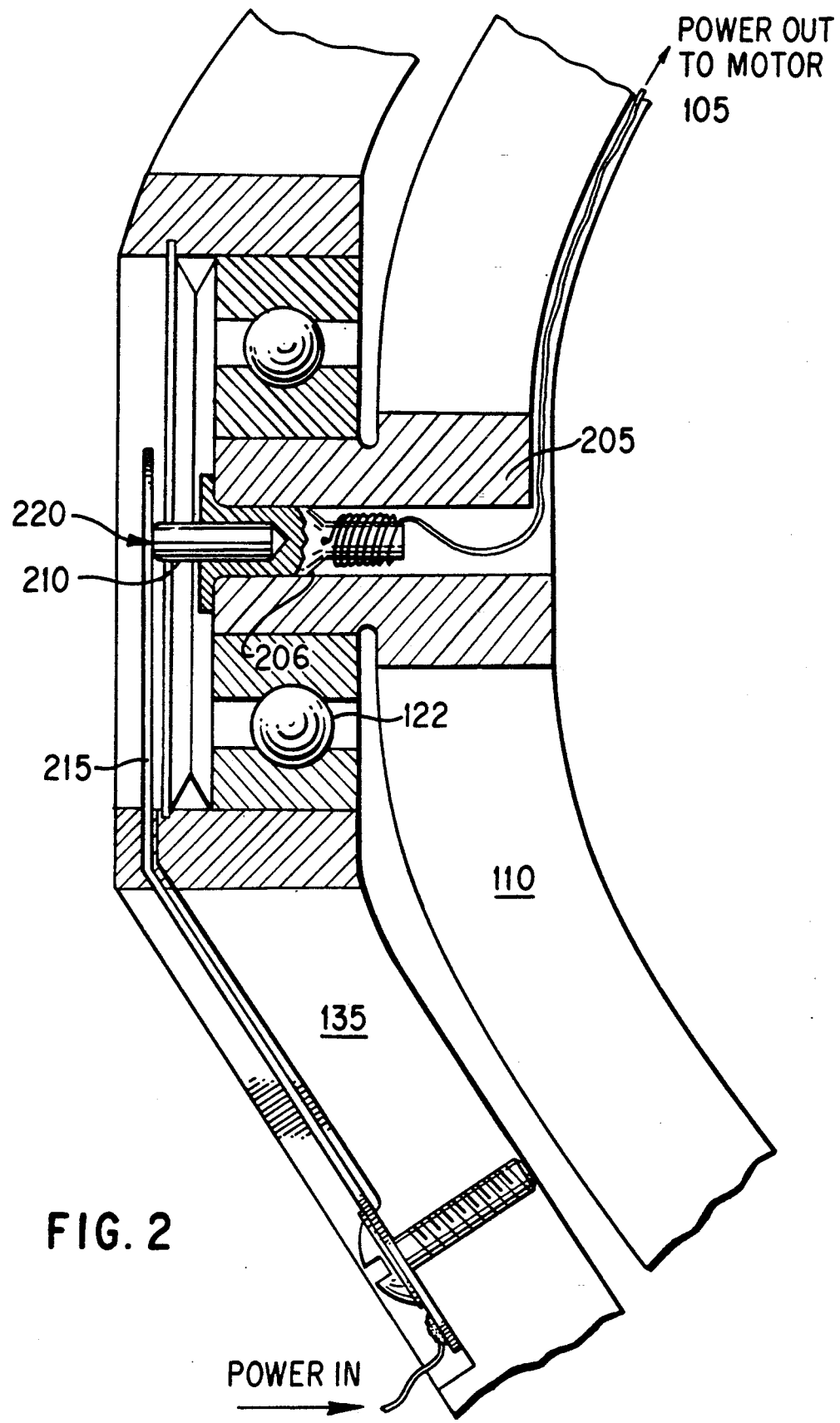
FIG. 2 is an expanded perspective view of inner gimbal 115 and bearing 122.

FIG. 1 is an expanded perspective view of one embodiment of the present invention. A brushless D.C. motor 105 at the core of the gyroscope spins continuously, providing the angular momentum that stabilizes the inner module of the gyroscope. Brushless D.C. motor 105 is a motor such as used in miniature cooling fans distributed by U.S. TOYO Fan Corporation. Brushless D.C. motor 105 is illustrated in the vertical cross section A—A of FIG. 1, and is firmly mounted to inner module 110 with motor shaft 108 aligned orthogonal to the axis of rotation of inner module 110 about inner gimbals 115 and 120. Inner module 110 consists of injection molded plastic and two conductive inner gimbals, gimbal 115 and gimbal 120. Inner gimbals 115 and 120 are located on and aligned with the axis of rotation of inner module 110. Further, inner gimbals 115 and 120 are electrically coupled to motor 105. The center of mass of inner module 110, which includes motor 105, is slightly displaced along the axis of rotation of motor shaft 108 below the axis of rotation of inner module 110. This results in a pendulous affect which causes motor shaft 108 to generally align with the gravity vector.

Inner gimbals 115 and 120 mechanically support inner module 110 and provide an electrical path for the transmission of power from the gimbals to motor 105 without restricting the travel of inner module 110. Two bearings support inner gimbals 115 and 120 relative to gimbal frame 135. Specifically, bearing 122 is mounted within bearing alignment hole 125 of gimbal frame 135 and supports inner gimbal 115. Similarly, bearing 124 is mounted within bearing alignment hole 130 of gimbal frame 135 and supports inner gimbal 120. Gimbal frame 135 also includes two conductive outer gimbals 140 and 145. Two bearings support the outer gimbals relative to shock frame 160. Specifically, bearing 146 is mounted within bearing alignment hole 150 of shock frame 160 and supports outer gimbal 140. Similarly, bearing 147 is mounted within bearing alignment hole 155 of shock frame 160 and supports outer gimbal 145. Outer gimbal 140 is electrically coupled to inner gimbal 115. Similarly, outer gimbal 145 is electrically coupled to inner gimbal 120. This completes the electrical path from the non-rotating shock frame 160 to motor 105 within inner module 110.

Shock frame 160 is mounted with shock absorbing rubber to outer housing 175, which consists of two halves. This shock mounting prevents damage to the bearings or optical sensors in the event that the gyroscope is dropped, and permits the inner assemblies to be constructed with finer tolerances than would be possible without the shock mounting. Shaft angle encoder sensing optics 165, discussed in more detail below, are mounted on shock frame 160.

Outer housing 175 is opaque so as to prevent outside light from interfering with the optical sensing system and is adapted for hand holding as described more fully below with reference to FIG. 5.

Cabling 180 transmits power from an interface box 185 to outer housing 175 and returns data signals from shaft angle encoder sensing optics 165. In the preferred embodiment interface box 185 translates signals from optical sensing system 165 into serial data for an RS-232 port. Wall adapter 190 provides D.C. power for motor 105 and shaft angle encoder sensing optics 165.

FIG. 2 is an expanded perspective view of inner gimbal 115 and bearing 122 and illustrates the construction details of inner gimbal 115. The construction of inner gimbal 120 and outer gimbals 140 and 145 are identical. Specifically, inner gimbal 115 includes a circular magnesium insert 205 which fits within the inner race of bearing 122. A conductive pin 210, having a diameter smaller than that of insert 205, is mounted concentrically within insert 205 and stainless steel insert 206 and is electrically coupled to motor 105. Pin 210 is preferably made of a low-friction low-torque conductive material such as silver graphite and designed to protrude from the inner race of bearing 122. The diameter of pin 210 is smaller than the diameter of the inner race so as not to contact the inner race and to minimize the friction of the rotating contact. A stainless steel spring 215 is mounted to gimbal frame 135 and aligned with and in electrical contact with protruding surface 220 of pin 210. Spring 215 is electrically coupled to a D.C. power source through outer gimbal 140. Spring 215 presses against pin 210 providing a low friction electrical connection between gimbal frame 135 and inner module 110.

Figure 3:
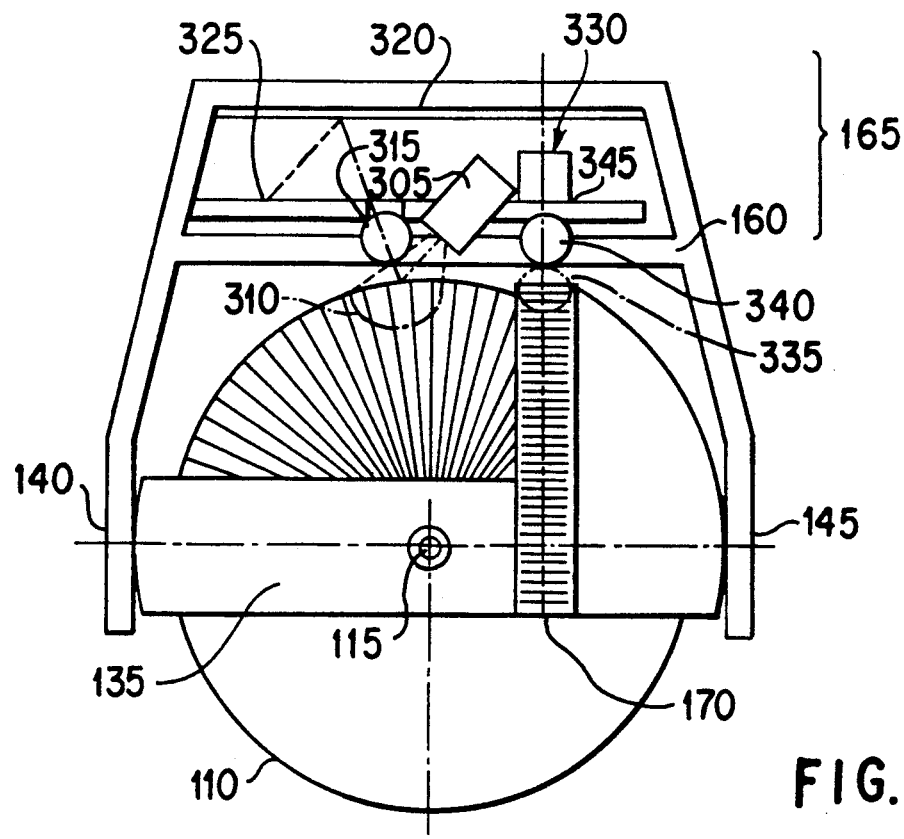
FIG. 3 is an illustration of the optical pattern on inner module 110, the optical pattern on gimbal frame 135, and the elements of shaft angle encoder sensing optics 165.

Inner module 110 has a hemispherical outer surface with an optical pattern which interacts with shaft angle encoder sensing optics 165 to sense the rotation of inner module 110 around its axis of rotation through gimbals 115 and 120. This optical pattern is illustrated in FIG. 3. The optical pattern on inner module 110 is constructed by first painting the hemispherical surface with a highly reflective aluminum flaked paint and then machining grooves of 0.015 inch depth and width along "lines of longitude" from gimbal 115 towards gimbal 120 along the surface. The grooves are machined to within 30 degrees of each inner gimbal and are 0.015 inches apart at 30 degrees from each gimbal. This pattern causes the spacing between the groove centerlines to widen to approximately 0.04 inches at the middle ("equator") of inner module 110. Inner module 110 is molded from a non-reflective black plastic. Thus the grooved portions of inner module 110 are non-reflective where the reflective paint has been machined off. This provides a precise optical pattern on inner module 110 having a high contrast ratio.

A second optical pattern is machined into gimbal frame 135 along a cylindrical section 170 of gimbal frame 135. This pattern interacts with shaft angle encoder sensing optics 165 for sensing rotation of gimbal frame 135 around its axis of rotation through gimbals 140 and 145. Cylindrical section 170 is geometrically centered about the axis of rotation of gimbal frame 135, which passes through gimbals 140 and 145. As with the optical pattern on inner module 110, the optical pattern on gimbal frame 135 is constructed by applying reflective paint to cylindrical section 170 and then machining grooves of 0.015 inch depth and width on the surface of cylindrical section 170. These grooves are machined along lines parallel to the axis of rotation of gimbal frame 135 and evenly spaced so that the light and dark strips are of equal width. Cylindrical section 170 is displaced slightly from the center of gimbal frame 135 so as not to interfere with the interaction of shaft angle encoder sensing optics 165 and the optical pattern on inner module 110. Specifically, the closest edge of cylindrical section 170 is spaced approximately 0.15 inches away from the "equator" of frame 170 passing through inner gimbals 115 and 120.

Shaft angle encoder sensing optics 165 interact with the optical pattern on inner module 110 so as to determine the rotation of inner module 110 about its axis of rotation. More specifically, shaft angle encoder sensing optics 165 include light sources for illuminating the optical patterns, lenses for focusing images of the patterns, and photodetectors for detecting changes in the optical patterns. Referring to FIG. 3, a first LED 305 is mounted to shock frame 160 at an angle of 30 degrees from vertical in a plane parallel to the axis through gimbals 140 and 145 so as to floodlight an area 310 of the optical pattern on inner module 110. This area is centered on the "equator" of frame 135 so as to provide maximum range of detectable movement of inner module 110 in both directions. Lens 315 and mirror 320 focus and reflect the image of the illuminated area 310 onto quad photodiode 325. Lens 315 is an injection molded lens of approximately ⅛ inch in diameter having a focal length of approximately 0.2 inches. Quad photodiode 325 is explained in more detail immediately below.

Figure 4:
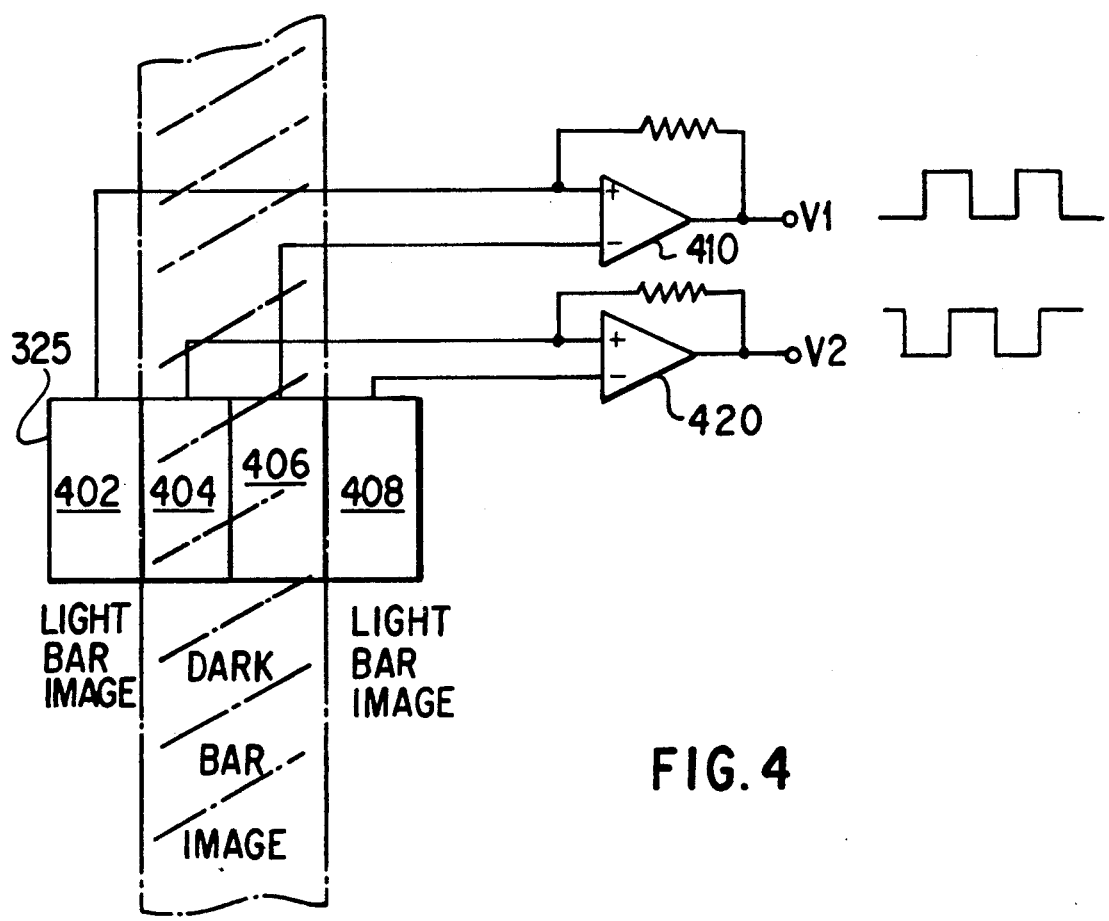
FIG. 4 is an illustration of a quad photodiode.

Quad photodiode 325 comprises four photodiodes, 402, 404, 406 and 408, located in a row as illustrated in FIG. 4, and centered 0.02 inches apart. The adjoining sides of the four photodiodes are aligned with the edges of the projected image of area 310. As illustrated, one period of the projected image of area 310 (one light and one dark bar) nominally covers the quad photodiode 325. Photodiodes 402 and 406 are coupled to comparator 420. Photodiodes 404 and 408 are coupled to comparator 410. The output V1 of comparator 410 is thus in phase quadrature with the output V2 of comparator 420. These outputs are then detected by conventional means to determine the rotation of the inner module. An example of phase quadrature resolution is provided in U.S. Pat. No. 4,346,989, above.

Shaft angle encoder sensing optics 165 also interact with the optical pattern on cylindrical section 170 so as to determine the rotation of gimbal frame 135 about its axis of rotation. More specifically, a second sensing system, similar to the one described above but rotated by 90 degrees, is positioned on shock frame 160 as illustrated in FIG. 3. LED 330 is mounted to shock frame 160 at an angle of 30 degrees from vertical in a plane parallel to the axis through gimbals 115 and 120 in alignment with cylindrical section 170 so as to floodlight an area 335 of the optical pattern on cylindrical section 170. Lens 340 and mirror 320 focus and reflect the image of the illuminated area 335 onto quad photodiode 345. Lens 340 is an injection molded lens of approximately ⅛ inches in diameter having a focal length of approximately 0.2 inches. Quad photodiode 345 comprises four photodiodes located in a row and is identical in construction to quad photodiode 325 illustrated in FIG. 4. The adjoining sides of the four photodiodes are aligned with the edges of the projected image of area 335.

Figure 5:
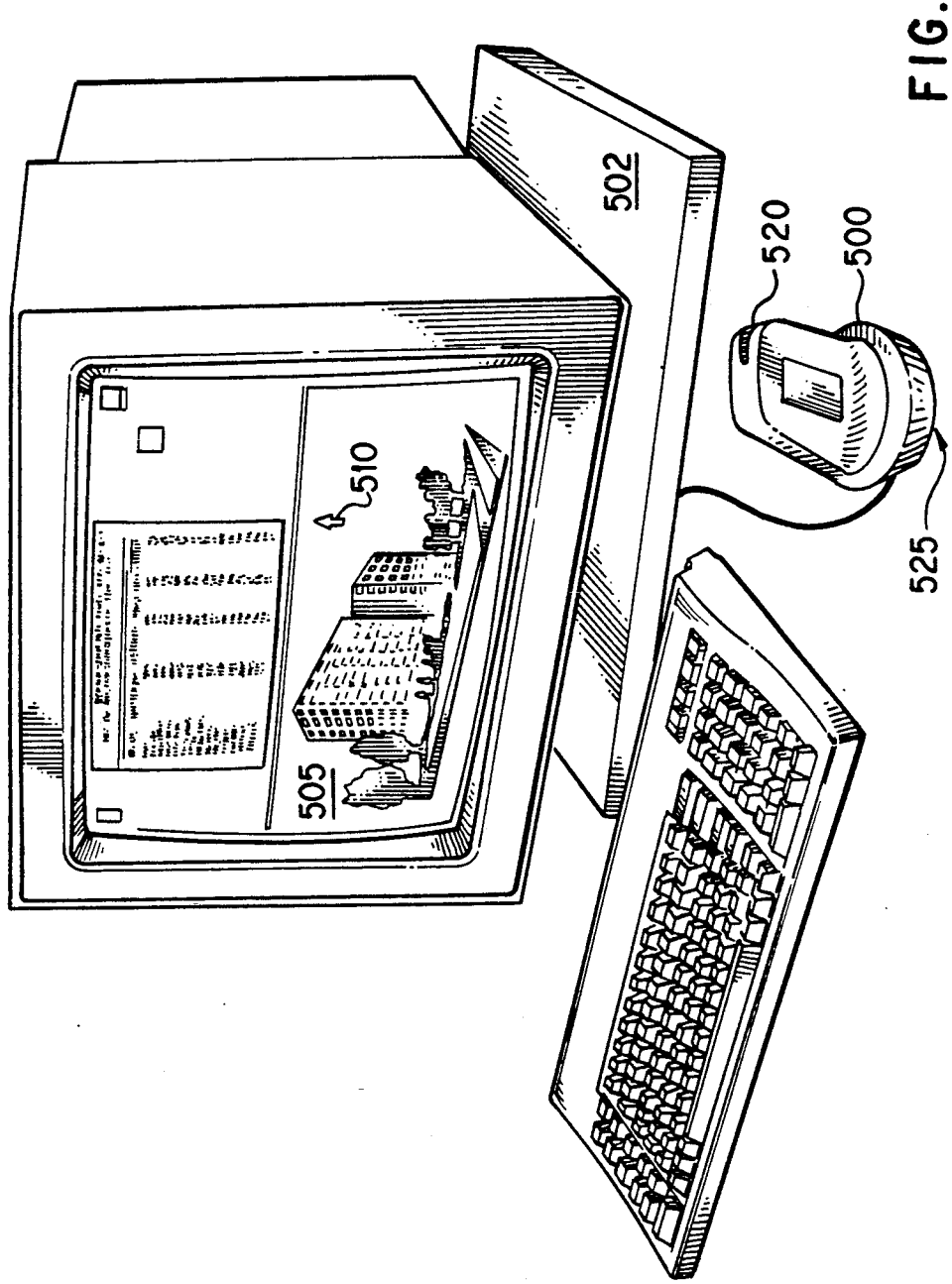
FIG. 5 is an illustration of the preferred embodiment of a gyroscopic pointing device 500 coupled to a computer and computer display 505.

FIG. 5 is an illustration of the preferred embodiment of a gyroscopic pointing device 500 coupled to a computer 502 and computer display 505. Computer 502 is adapted so that changing the pitch of controller 500 relative to the gravity vector changes the vertical position of cursor 510 on computer display 505. That is, rotating the controller forward ("pitch") causes the cursor to drop on a vertical computer screen, rotating it back causes the cursor to rise, as if the controller was pointing at the cursor. Similarly, rotating the controller from side to side ("roll") changes the horizontal position of cursor 510 on computer display 505. That is, rotating the controller left causes the cursor to move left on a vertical computer screen, rotating it right causes the cursor to move to the right, again, as if the controller was pointing at the cursor. Controller 500 further includes a thumb operated push button 520 and has a rounded hemispherically shaped bottom portion 525 adapted for smoothly rocking on a flat surface when the pitch and roll of controller 500 is varied while resting on a flat surface. This can be a two position switch, where initial pressure on the switch activates the controller and causes the cursor to move in response to the controller, and a second position of the switch results in a "pick" or "select" signal being transmitted to the computer.

Figure 6A:
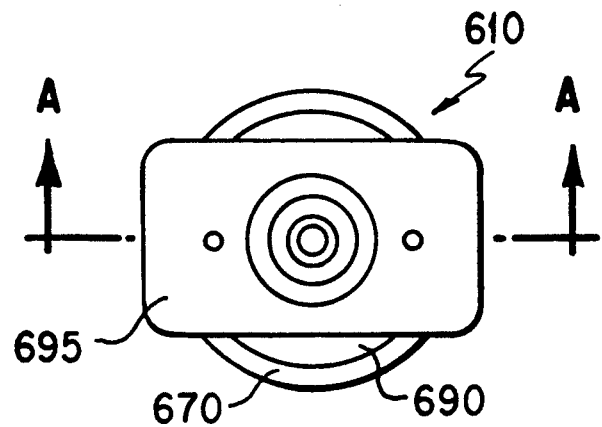
FIG. 6a is a top view of the inner module of another preferred embodiment of the preferred invention.
Figure 6B:
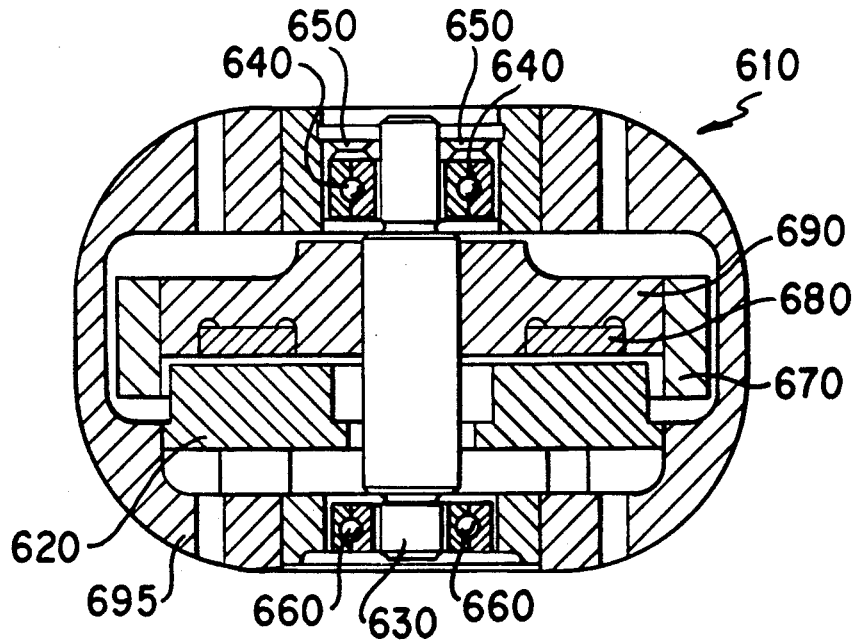
FIG. 6b is a cross section view of the inner module of FIG. 6a along section A—A.

FIG. 6a is a top view of an inner module 610 of another preferred embodiment of the present invention. FIG. 6b is a cross section view of inner module 610 of FIG. 6a along section A—A. As throughout the present specification, the convention that the arrows of the cross section line A—A point towards the eye of the observer of the cross section has been used. Inner module 610 includes a motor 620, a magnesium spindle 630, and unflanged ball bearing 640, four belleville washers 650, a flanged ball bearing 660, a brass flywheel 670, a permanent magnet 680, a plastic hub 690, and a plastic body 695. Power is supplied to the motor through the bearings as described with reference to FIG. 2.

Inner module 610 is press fit into an inner gimbal 710 and attached with four screws as illustrated in FIGS. 7a and 7b. FIG. 7a is a top view of the gimbal assembly including inner module 610 of FIGS. 6a and 6b. FIG. 7b is a cross section view of the gimbal assembly of FIG. 7a along section A—A. Inner gimbal 710 is mounted to outer gimbal 720 at one end by spindle 730, unflanged ball bearing 735 and four belleville washers 740. Inner gimbal 710 is mounted to outer gimbal 720 at the other end by spindle 745 and flanged ball bearing 750. Similarly, outer gimbal 720 is mounted to frame 760 on one end by spindle 765 and bearing 766 and on the other end by spindle 770 and bearing 772. Inner gimbal 710 includes a cylindrical ridge 755 as illustrated in FIGS. 7a and 7b. Cylindrical ridge 755 is one-quarter of an inch wide and is cylindrical with respect to the axis of rotation of inner gimbal 710, encompassing 200 degrees of the circumference of inner gimbal 710. Cylindrical ridge 755 is positioned near spindle 765. Specifically, cylindrical ridge 765 is aligned with spindle 765 such that an optical pattern 770 of optical strip 775, illustrated in FIG. 7c, is aligned with spindle 765 as inner gimbal 710 rotates. Optical strip 775 is mounted to cylindrical ridge 755 by adhering a mounting section 780 of optical strip 775 to cylindrical ridge 755. Optical pattern 770 is ¼ inch wide, covers 200 degrees of the circumference of inner gimbal 710, and has an alternating pattern of clear and dark bars. Optical strip 775 is described in more detail below with reference to FIG. 12. The dark bars are 0.0036 inch wide and the period is 0.0064 inch, giving a duty cycle of 55% dark.

Figure 8:
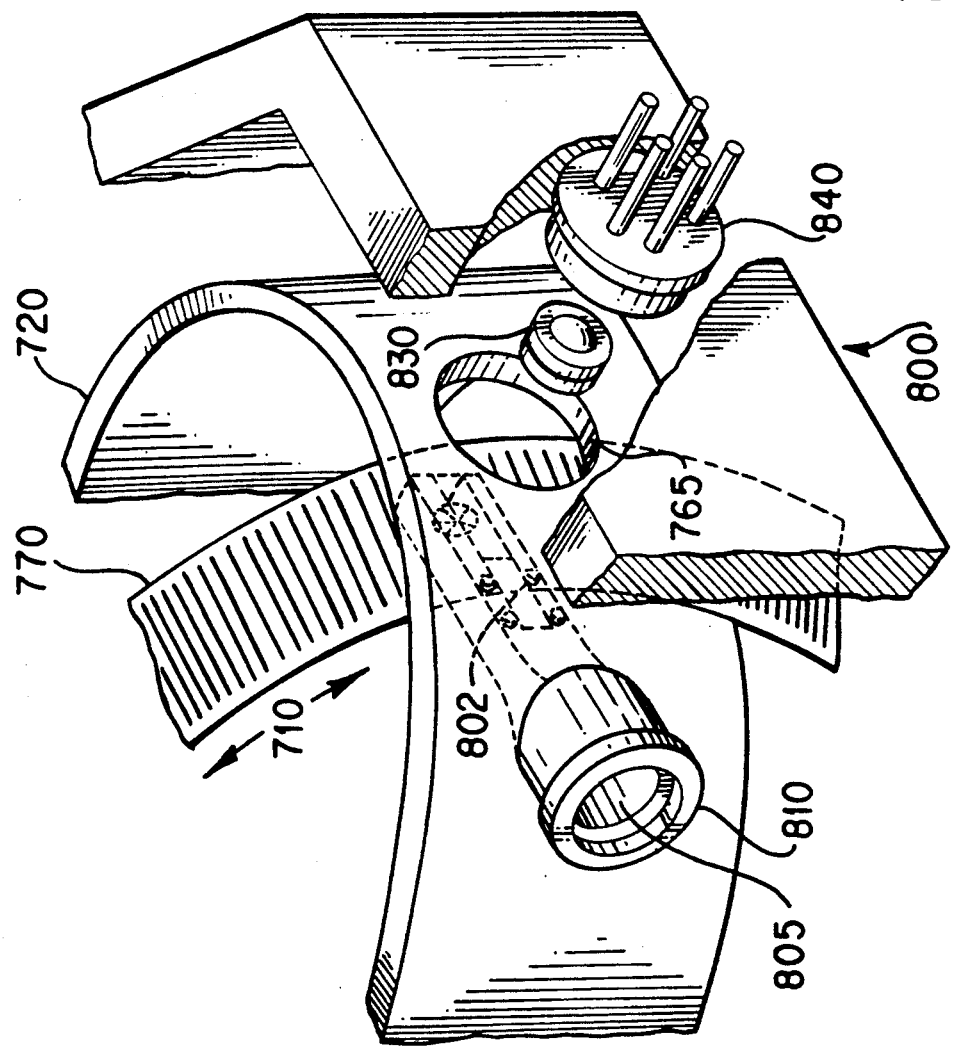
FIG. 8 is a perspective view of inner gimbal shaft angle encoder 800.
Figure 10:
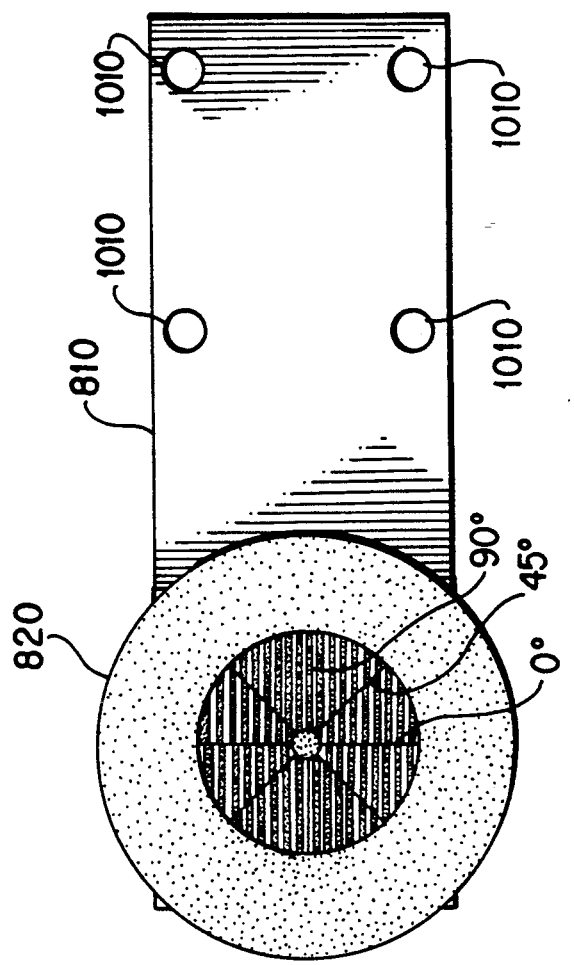
FIG. 10 is a top view of inner phase plate 820 mounted and registered on light pipe 810.
Figure 9:
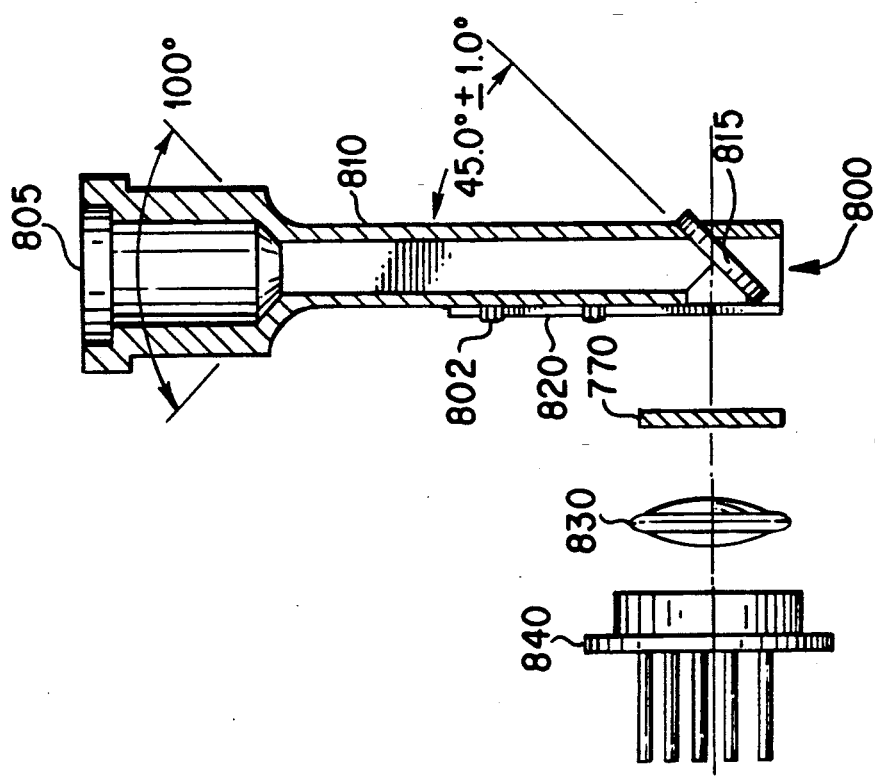
FIG. 9 is a side view of the light path of inner gimbal shaft angle encoder 800.

The measurement of the rotation of inner gimbal 710 with respect to outer gimbal 720 is explained with reference to FIG. 8, a perspective view of inner gimbal shaft angle encoder 800, and FIG. 9, a side view of the light path of inner gimbal shaft angle encoder 800. An infrared light emitting diode (LED) 805 is mounted in a light pipe 810. Light pipe 810 is mechanically mounted to outer gimbal 720 and concentrates light from LED 805 onto a first surface mirror 815. First surface mirror 815 is aligned to reflect the concentrated light from LED 805 toward spindle 765. Inner phase plate 820 is mounted to light pipe 810, as illustrated in FIG. 10, and centered on the centerline of spindle 765 between first surface mirror 815 and spindle 765. This alignment is precisely registered by aligning mounting holes 1010 with pins 802 on light pipe 810. Mounting holes 1010 are precisely registered in the optical pattern of inner phase plate 820.

The pattern of light radiating from inner phase plate 820 then passes through optical pattern 770 of optical strip 775, mounted to inner gimbal 610. The concentrated and reflected light, which has now passed through inner phase plate 820 and optical pattern 770, is now focused by a lens 830 mounted within bearing 766 of outer gimbal 720 which focuses the image onto a quad photodiode 840. A front view of quad photodiode 840 is provided in FIG. 11.

Figure 17:
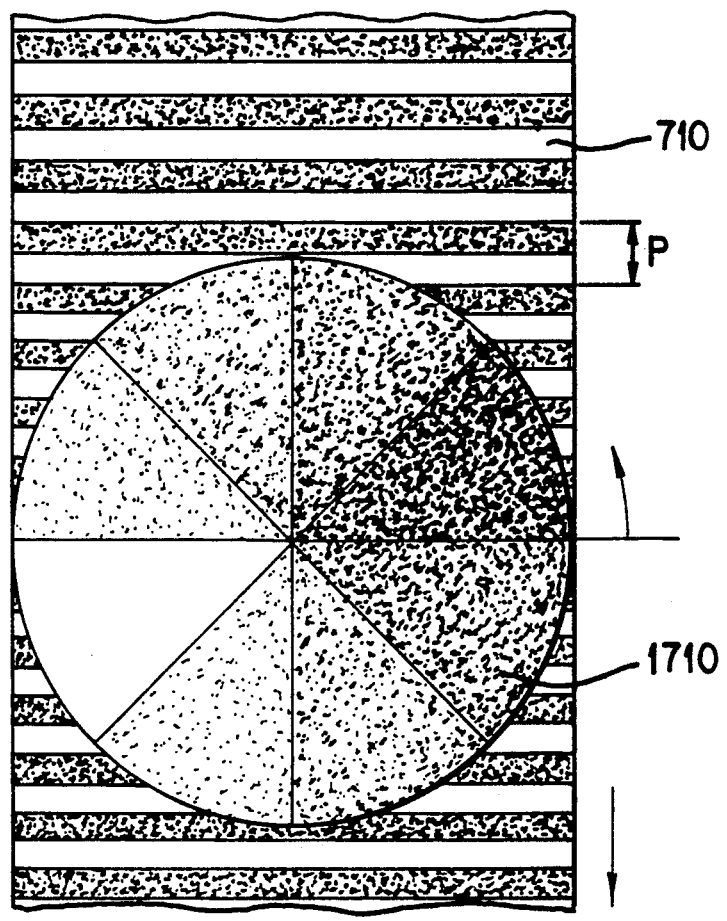
FIG. 17 is an illustration of the circular interference pattern.

Inner gimbal shaft angle encoder 800 operates as explained below. As illustrated in FIG. 10, the optical image of inner phase strip 820 has been constructed by taking the pattern of optical pattern 770 and considering a circular pattern composed of eight pie-shaped slices. When observing the pattern by looking from quad photodiode 840 towards light pipe 810, as illustrated in FIG. 10, the pattern of each slice is moved "down" slightly as the slices are taken in turn counter clockwise. More specifically, each slice is moved "down" by 45 degrees of phase in a direction orthogonal to the lines of the original pattern. Mathematically, if the period of the optical pattern is P, the pattern of each slice is moved down P/8 as the slices are taken in a counter clockwise manner. It should be specifically noted that while the pattern of the preferred embodiment is composed of eight slices, a pattern having a fewer or greater number of slices, or a continuous pattern, would also be equivalent. The important characteristic is that the phase of the optical pattern changes as a function of the rotation of the pattern. The circular interference pattern resulting from the reflected light passing through inner phase plate 820 and optical pattern 770 is brightest where inner phase strip 820 is in phase with optical pattern 770, gradually darker as inner phase strip 820 becomes out of phase with optical pattern 770, and darkest 180 degrees opposite the lightest image where inner phase strip 820 is out of phase with optical pattern 770. Circular interference pattern 1710 is illustrated in FIG. 17, which is a view as looking along the axis of inner gimbal 610 towards phase plate 820. Circular interference pattern 1710 rotates clockwise as optical pattern 710 on inner gimbal 610 moves up with respect to outer gimbal 720. It rotates counterclockwise as optical pattern 710 on inner gimbal 610 moves down with respect to outer gimbal 720. Circular interference pattern 1710 makes one full revolution for each Period (P) of movement of optical pattern 710. The rotation of the circular interference pattern thus provides a measure of the rotation of inner gimbal 610.

Figure 11:
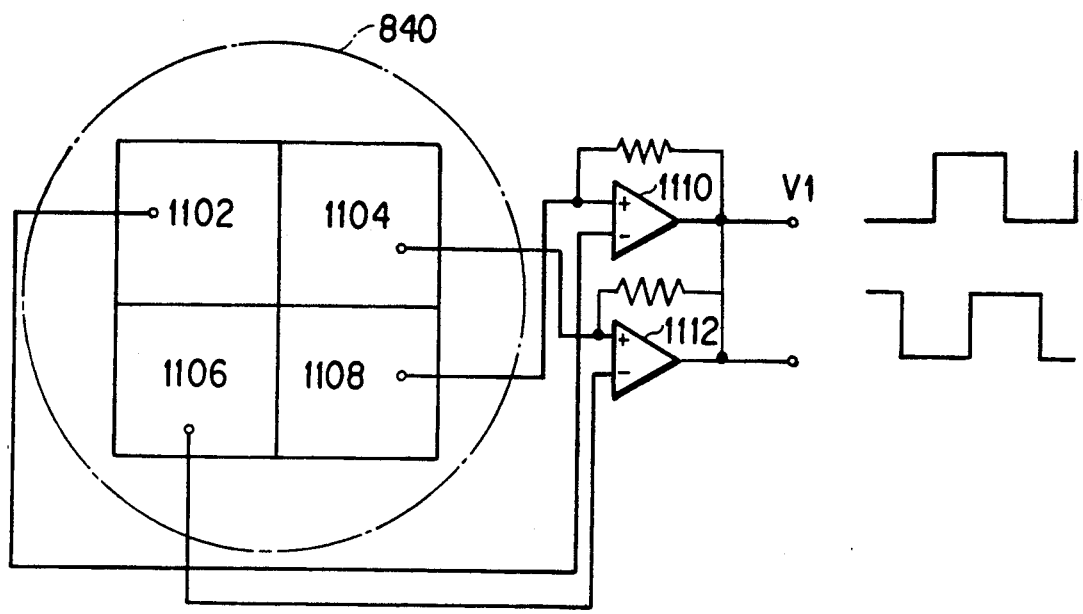
FIG. 11 is a front view of quad photodiode 840 and the associated electronics.

The rotation of the circular interference pattern is detected by quad photodiode 840. Quad photodiode 840 comprises four photodiodes, 1102, 1104, 1106 and 1108, arranged in a square as illustrated in FIG. 11. More precisely, the four photodiodes are spaced apart by 90 degrees with respect to the rotation about the centerline of spindle 765. The center of quad photodiode 840 is aligned with the centerline of spindle 765 and the center of the interference pattern. The four photodiodes are centered 0.02 inches apart. Photodiodes 1102 and 1108 are coupled to comparator 1110. Photodiodes 1104 and 1106 are coupled to comparator 1112. Since the photodiodes are rotationally 90 degrees apart, the output V1 of comparator 1110 is in phase quadrature with the output V2 of comparator 1112. These outputs are then interpreted by conventional means to determine the rotation of inner gimbal 610.

Figure 14:
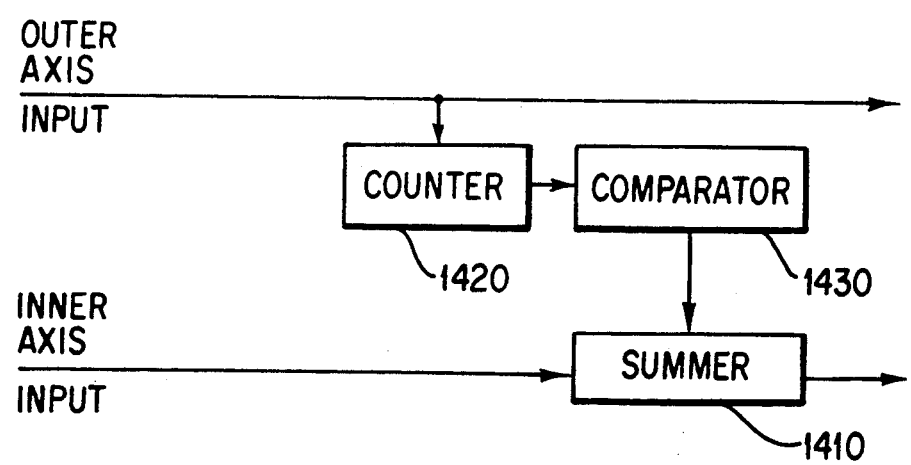
FIG. 14 is a block diagram of a correction circuit.

Quad photodiode is attached to frame 760. However, inner phase plate 820 is mounted to outer gimbal 720. Accordingly, if the outer gimbal is rotated with respect to the frame, it is interpreted as a small rotation of inner gimbal. This is undesirable but quite small. Specifically, for every positive 90 degrees of rotation of outer gimbal 720, inner gimbal shaft angle encoder 800 varies by one bit (The period of the pattern on optical strip 775 divided by 4.) This is corrected by use of a correction summer as illustrated in FIG. 14. As illustrated, the inner axis input is counted by summer 1410. Similarly, the outer axis input is counted by counter 1420. When digital comparator 1430 detects a rotation of outer axis of positive 90 degrees, one bit is added to summer 1410. When digital comparator 1430 detects a rotation of outer axis of negative 90 degrees, one bit is subtracted from summer 1410. Alternatively, this correction could be done in software.

Figure 12:
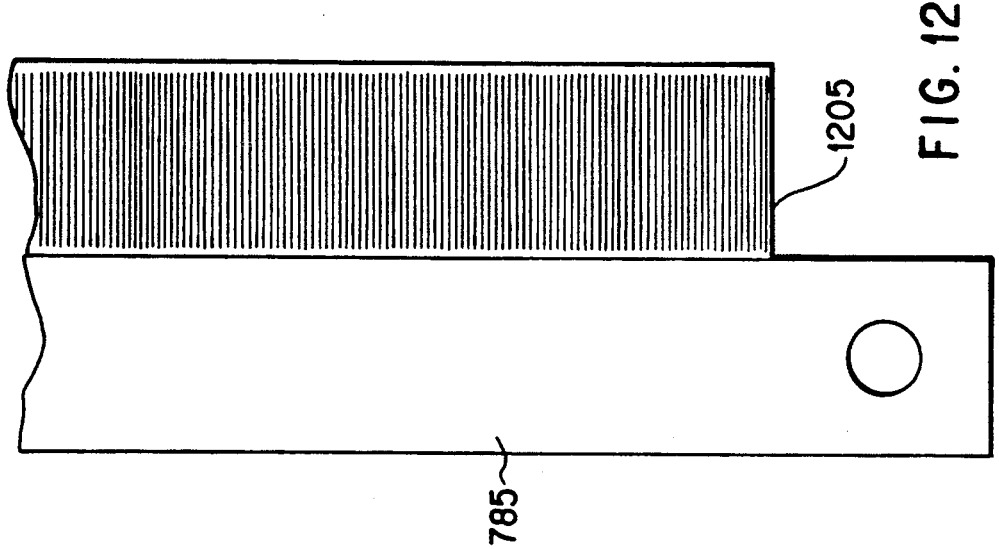
FIG. 12 is an illustration of optical strip 785.

A second shaft angle encoder is used to measure the rotation of outer gimbal 720 with respect to frame 760. Optical strip 785, a portion of which is illustrated in FIG. 12, is mounted to a second cylindrical ridge 790 fixed to outer gimbal 720, as illustrated in FIG. 7a. Optical strip 785 is a transparent 7 mil mylar strip with photographically printed lines and wrapped on cylindrical ridge 790 around 200 degrees of range. Optical strip 785 is identical to optical strip 775, and is ¼ inch wide and has an alternating pattern of clear and dark bars strips with 450 lines per inch. The dark bars are 0.0036 inch wide and the period is 0.0064 inch, giving a duty cycle of 55% dark.

Figure 13:
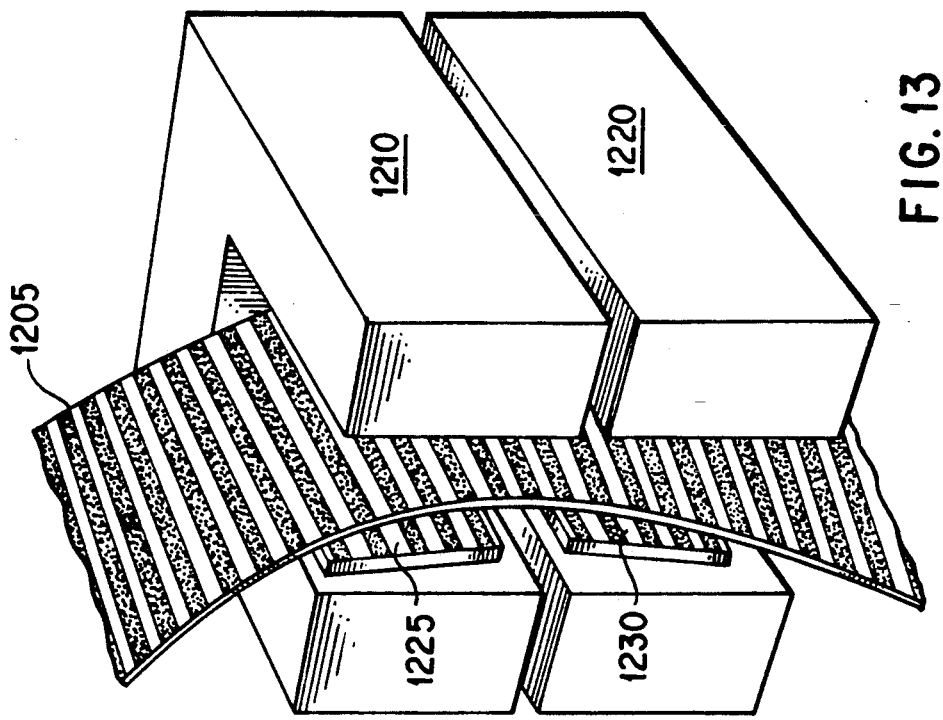
FIG. 13 is a perspective view of outer gimbal shaft angle encoder 1300.
Figure 15:
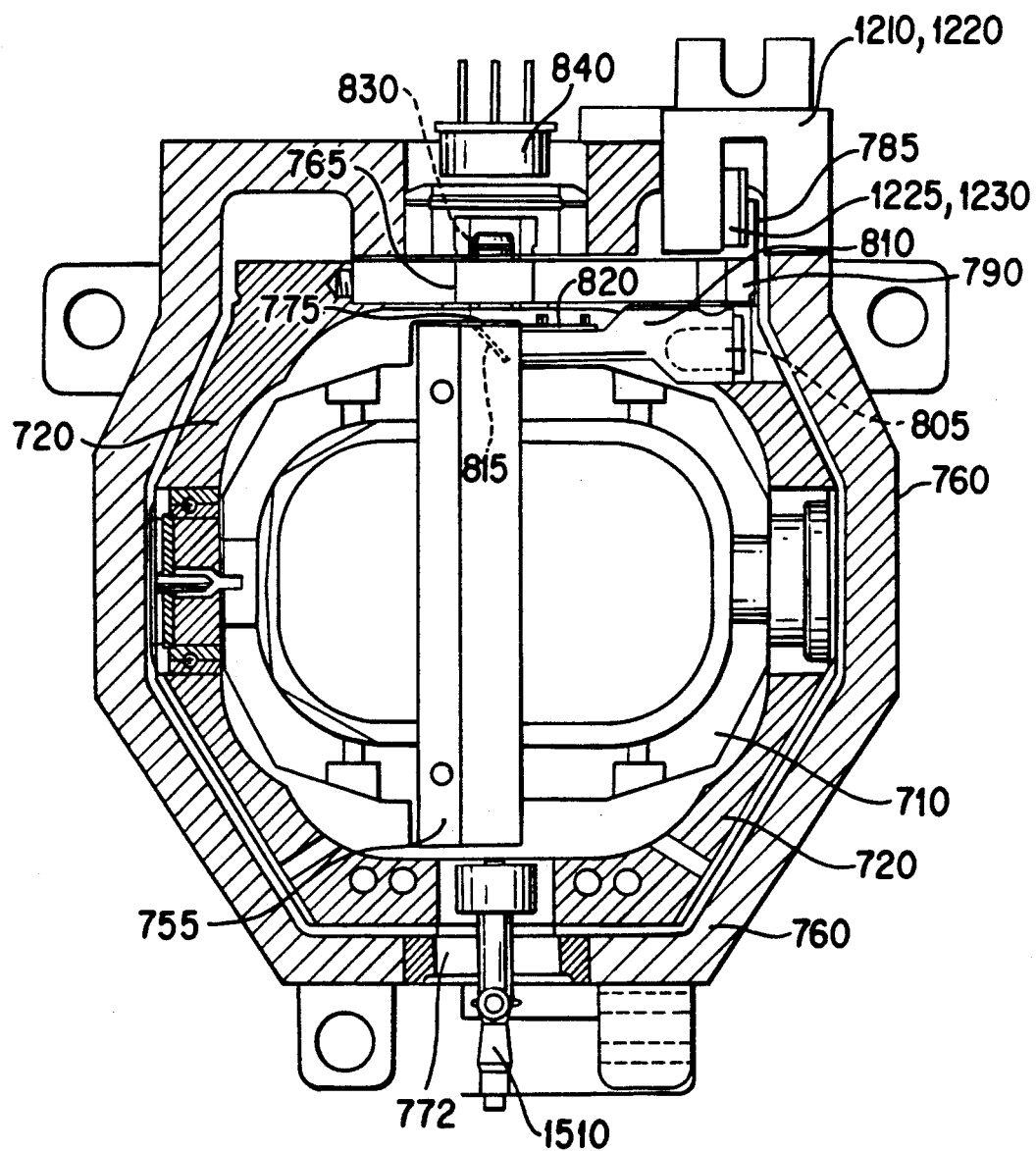
FIG. 15 is a cross section of a gyroscope according to the present invention.

The measurement of the rotation of outer gimbal 720 with respect to frame 760 is explained with reference to FIG. 7, FIG. 13, a perspective view of outer gimbal shaft angle encoder 1300, and FIG. 15, a cross section of a gyroscope according to the present invention.

Optical pattern 1205 of optical strip 785 is mounted to pass through two optical switches, 1210 and 1220, as outer gimbal 720 rotates with respect to frame 760. Optical switches 1210 and 1220 are mounted to frame 760 such that a direct light path in each optical switch passes through optical pattern 1205. These optical switches provide a square wave output, either a logic level one or zero, in response to the level of light passing between light sources and receivers built into the switches. A suitable photologic optical switch is available from Optek of Austin, Tex., part number OPB990P55. A phase plate is mounted in the light path of each optical switch in close proximity to optical pattern 1205, with a spacing of approximately 0.005 inch between each phase plate and optical pattern 1205. Phase plates 1225 and 1230 are aligned with optical pattern 1205 and are made of the same material and have the same optical patterns as optical pattern 1205. Phase plate 1225 is mounted to optical switch 1210, phase plate 1230 is mounted to optical switch 1220. Phase plates 1225 and 1230 are mounted so as to be 90 degrees out of phase. Thus the light level passing through the optical switches alternates between light and dark as outer gimbal 720 rotates with respect to frame 760. Since the two optical switches are aligned in quadrature, the electrical output from the optical switches is also in quadrature. These outputs are then interpreted by conventional means to determine the rotation of outer gimbal 720.

As described, inner gimbal shaft angle encoder 800 utilizes spindle 765 as an optical path, thus preventing its use as an electrical contact as described in FIG. 2. Accordingly, both power contacts are connected between frame 760 and outer gimbal via a miniature phonoplug 1510 located within bearing 772. One contact is made to the end of phonoplug 1510, one contact is on the side of phonoplug 1510.

Figure 16A:
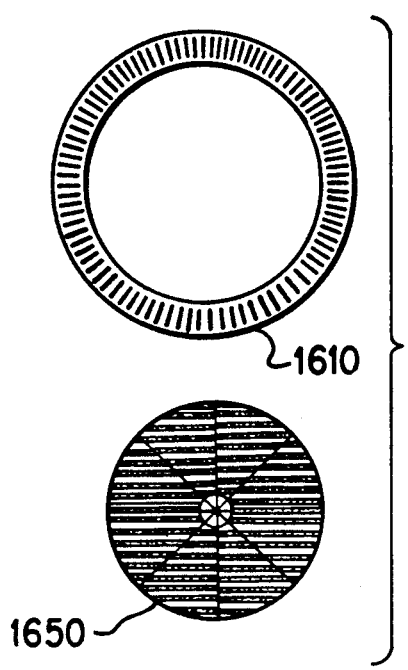
FIGS. 16a, 16b and 16c are illustrations of an alternative embodiment adapted to provide 360 degrees of rotation.
Figure 16B:
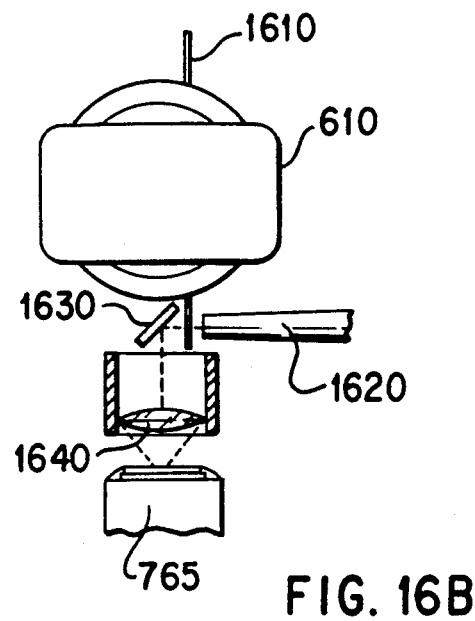
Figure 16C:
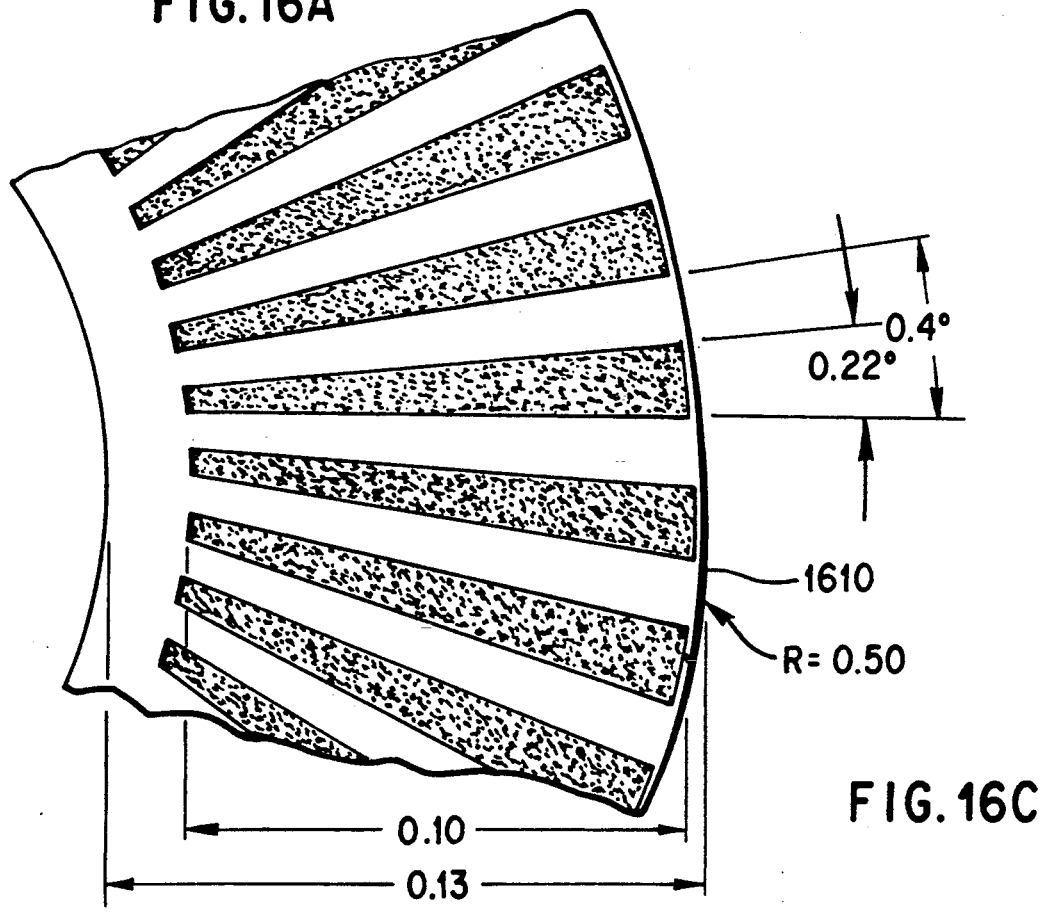

FIG. 16 illustrates an alternative to inner gimbal shaft angle encoder 800 adapted to provide uninhibited 360 degrees of rotation and to be easily manufacturable. Specifically, it has proven difficult to obtain 360 degree of rotation with optical strip 775 because of the difficulty of properly joining the ends of the strip. Accordingly, in the improvement illustrated in FIG. 16, optical strip 775 is replaced with a continuous circular optical pattern 1610 mounted to inner gimbal 610. Continuous circular optical pattern 1610 comprises alternating light and dark radial bars in a pattern of radial angular segments, or "pie-slices." As illustrated, the period of the pattern is 0.4 degrees, the width of a dark bar is 0.22 degrees, the width of the optical pattern is 0.10 inches, and the radius of the outside circumference of optical pattern 1610 is 0.50 inches. A light source 1620, mirror 1630 and lens 1640 focus and align an image of optical pattern 1610 with spindle 765. The construction and operation of the inner gimbal shaft angle encoder is otherwise similar to the construction of the operation of inner gimbal shaft angle angle encoder 800. It should be noted, however, that the phase plate of the improved inner gimbal shaft angle encoder is constructed of slices of the pattern from circular optical pattern 1610, which comprises slightly diverging lines, and not the parallel lines of the inner phase plate 820.

While the invention has been particularly taught and described with reference to the preferred embodiment, those versed in the art will appreciate that minor modifications in form and detail may be made without departing from the spirit and scope of the invention. For instance, although the illustrated embodiment teaches the detection of two angles from a vertically oriented gyroscope having two degrees of freedom, the invention could be used in different types of gyroscopes or in other applications of shaft angle encoders. Similarly, while the rotational encoder has been taught with respect to use with the inner gimbal of a gyroscope, it can also be used to advantage with respect to the outer gimbal or otherwise as a generalized shaft angle encoder. Accordingly, all such modifications are embodied within the scope of this patent as properly come within our contribution to the art and are particularly pointed out by the following claims.

I claim:

1. A shaft angle encoder for determining the rotation of an inner gimbal with respect to an outer gimbal in a two axis gimbal system having two orthogonal rotational degrees of freedom of movement between the housing and the inner gimbal, the shaft angle encoder comprising:

an outer gimbal bearing transparent along its axis:

an optical pattern mounted on the inner gimbal concentrically about the axis of rotation of the inner gimbal and optically aligned with the outer gimbal bearing;

means for illuminating the optical pattern;

phase plate means mounted to the outer gimbal so as to optically interfere with the image of the portion of the optical pattern optically aligned with the outer gimbal bearing for providing an interference pattern which rotates about its optical axis as the inner gimbal rotates with respect to the outer gimbal; and detection means mounted to the housing and aligned to receive the rotating interference pattern for detecting the rotation of the rotating interference pattern;

wherein the optical path from the the image through the phase plate to the detection means passes through the transparent axis of the outer gimbal bearing.

2. A shaft angle encoder as in claim 1 wherein the means for illuminating the optical pattern comprises a light source mounted to the outer gimbal.

3. A shaft angle encoder as in claim 1 wherein the means for illuminating the optical pattern comprises a light source mounted to the outer gimbal and a mirror mounted to the outer gimbal for reflecting the light onto the image.

4. A shaft angle encoder as in claim 1 wherein the phase plate means comprises a pattern complementary to the optical pattern and has the same period as the optical pattern and the phase of the pattern of the phase plate means varies as a function of the angle of rotation about its optical axis.

5. A shaft angle encoder as in claim 1 further comprising an outer gimbal shaft angle encoder coupled to detect the rotation of the outer gimbal with respect to the housing and correction means, coupled to the detection means and to the outer gimbal shaft angle encoder for providing an indication of the rotation of the inner gimbal corrected for the rotation of the outer gimbal.

6. A shaft angle encoder as in claim 1 wherein the detection means comprises a quadrature detector having four detectors symmetrically arranged 90 degrees apart about the optical axis of the rotating interference pattern.

7. A shaft angle encoder as in claim 6 wherein the optical pattern is mounted on a cylindrical portion of the inner gimbal and comprises an optical pattern having alternating light and dark bars.

8. A shaft angle encoder as in claim 6 wherein the optical pattern comprises a continuous ring mounted on the inner gimbal and comprises an optical pattern having alternating light and dark bars in a radial pattern.

9. A shaft angle encoder for determining the rotation of a shaft relative to a frame, the shaft angle encoder comprising:
   an optical pattern concentrically mounted to the shaft;
   means for illuminating a portion of the optical pattern;
   phase plate means aligned so as to interfere with the portion of the optical pattern for providing a circular interference pattern which rotates about its optical axis as the shaft rotates with respect to the frame; and
   means for detecting the rotation of the rotating interference pattern.

10. A shaft angle encoder as in claim 9 wherein the means for detecting comprises a quadrature detector mounted to the frame, optically aligned with the phase plate means, and having four detectors symmetrically arranged 90 degrees apart about its center.

11. A shaft angle encoder as in claim 9 wherein the optical pattern is mounted on a cylindrical portion of the shaft and comprises an optical pattern having alternating light and dark bars.

12. A shaft angle encoder as in claim 9 wherein the optical pattern comprises a continuous ring mounted on the shaft and comprises an optical pattern having alternating light and dark radial angular segments.

13. A shaft angle encoder as in claim 9 wherein the means for illuminating the optical pattern comprises a light source mounted to the frame.

14. A shaft angle encoder as in claim 9 wherein the means for illuminating the optical pattern comprises a light source mounted to the frame and a mirror mounted to the frame for reflecting the light into alignment with the means for detecting.

15. A shaft angle encoder as in claim 9 wherein the phase plate means is mounted to the frame and comprises a pattern complementary to the optical pattern and having the same period as the optical pattern and aligned with the optical pattern, with the phase of the pattern of the phase plate means varied as a function of the angle of rotation about its center.

16. A gyroscope having a shaft angle encoder as in claim 1.

17. A shaft angle encoder for determining the rotation of an inner gimbal with respect to an outer gimbal in a two axis gimbal system having two orthogonal rotational degrees of freedom of movement between the housing and the inner gimbal, the shaft angle encoder comprising:
   an outer gimbal bearing transparent along its axis;
   an optical pattern mounted on the inner gimbal;
   means for illuminating the optical pattern;
   phase plate means mounted to the outer gimbal for optically interfering with the image of a portion of the optical pattern and for providing a circular interference pattern which rotates about its optical axis in response to rotation of the inner gimbal with respect to the outer gimbal;
   detection means mounted to the housing for detecting the rotation of the rotating interference pattern; and
   optical path means for providing an optical path from the image through the phase plate to the detection means, the optical path passing through the transparent axis of the outer gimbal bearing.

18. A shaft angle encoder for determining the rotation of an inner gimbal with respect to an outer gimbal in a two axis gimbal system having two orthogonal rotational degrees of freedom of movement between the housing and the inner gimbal, the shaft angle encoder comprising:
   two inner gimbal bearings suspending the inner gimbal from the outer gimbal along a first axis;
   two outer gimbal bearings suspending the outer gimbal from the frame along a second axis orthogonal to the first axis, one outer gimbal bearing being transparent along its axis;
   an optical pattern mounted on the inner gimbal concentrically about the axis of rotation of the inner gimbal and optically aligned with the outer gimbal bearing;
   means for illuminating the optical pattern;
   phase plate means mounted to the outer gimbal so as to optically interfere with the image of the portion of the optical pattern optically aligned with the outer gimbal bearing for providing an interference pattern which rotates about its optical axis as the inner gimbal rotates with respect to the outer gimbal; and
   detection means mounted to the housing and aligned to receive the rotating interference pattern for detecting the rotation of the rotating interference pattern;
   wherein the optical path from the image through the phase plate to the detection means passes through the transparent axis of the outer gimbal bearing.

* * * * *